United States Patent

(12) United States Patent
Horizumi

(10) Patent No.: US 10,411,547 B2
(45) Date of Patent: Sep. 10, 2019

(54) ELECTRIC MOTOR AND METHOD FOR MANUFACTURING THE SAME

(71) Applicants: DENSO CORPORATION, Kariya, Aichi-pref. (JP); c/o ASMO CO., LTD., Kosai, Shizuoka-pref. (JP)

(72) Inventor: Rintaro Horizumi, Kosai (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 253 days.

(21) Appl. No.: 15/152,235

(22) Filed: May 11, 2016

(65) Prior Publication Data

US 2016/0336831 A1    Nov. 17, 2016

(30) Foreign Application Priority Data

May 13, 2015    (JP) .................................. 2015-98194

(51) Int. Cl.
*H02K 1/32* (2006.01)
*H02K 5/10* (2006.01)
*H02K 11/33* (2016.01)
*H02K 5/22* (2006.01)

(52) U.S. Cl.
CPC ............... *H02K 5/10* (2013.01); *H02K 5/225* (2013.01); *H02K 11/33* (2016.01)

(58) Field of Classification Search
CPC ........... H02K 5/10; H02K 11/33; H02K 5/225
USPC ......................................................... 310/64
See application file for complete search history.

(56) References Cited

U.S. PATENT DOCUMENTS

| | | | | |
|---|---|---|---|---|
| 4,840,523 A | * | 6/1989 | Oshida ................ | F16B 19/1081 411/48 |
| 2012/0262833 A1 | * | 10/2012 | Kishimoto ........... | H05K 7/1432 361/142 |
| 2012/0286604 A1 | * | 11/2012 | Abe ....................... | H02K 11/33 310/71 |
| 2014/0062236 A1 | | 3/2014 | Taniguchi et al. | |
| 2014/0125173 A1 | * | 5/2014 | Hayashi ................ | H02K 3/522 310/88 |
| 2014/0210306 A1 | | 7/2014 | Suzuki et al. | |

FOREIGN PATENT DOCUMENTS

| | | |
|---|---|---|
| GB | 2375437 | 11/2002 |
| JP | H5-219673 | 8/1993 |
| JP | H9-046942 | 2/1997 |
| JP | 2004-120911 | 4/2004 |
| JP | 2005-318729 | 11/2005 |
| JP | 2008-278621 | 11/2008 |
| JP | 2014-054051 | 3/2014 |

* cited by examiner

*Primary Examiner* — Jianchun Qin
(74) *Attorney, Agent, or Firm* — Knobbe, Martens, Olson & Bear, LLP

(57) ABSTRACT

A terminal insertion hole is formed in a rear end frame. A grommet has a main body portion and a flanged portion. A terminal holding hole is formed in the main body portion of the grommet. The grommet is inserted into the terminal insertion hole of the rear end frame and the flanged portion is in contact with a rear-side axial-end surface of the rear end frame, that is, a peripheral portion of a rear-side open end of the terminal insertion hole. The grommet is assembled to the rear end frame by inserting the grommet into the terminal insertion hole from the rear-side open end.

8 Claims, 5 Drawing Sheets

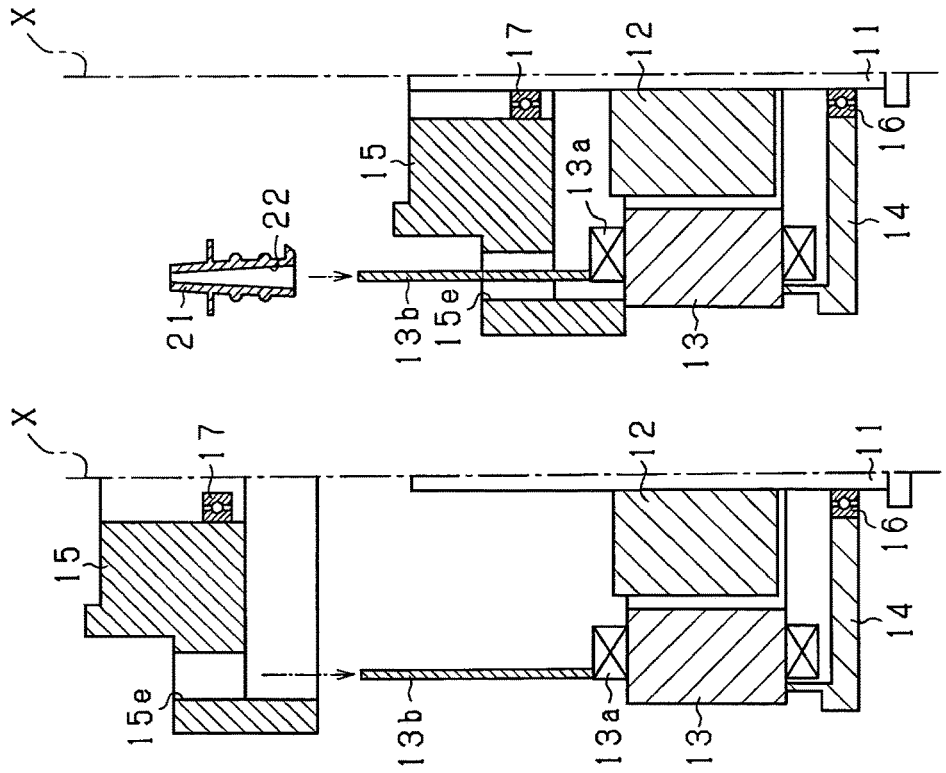

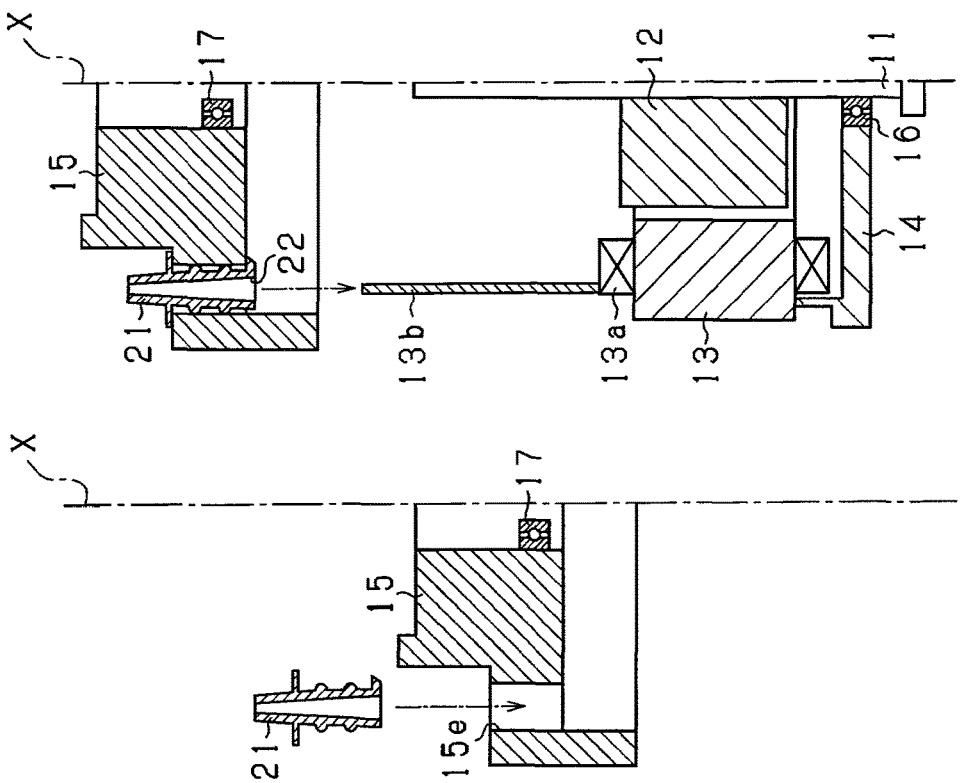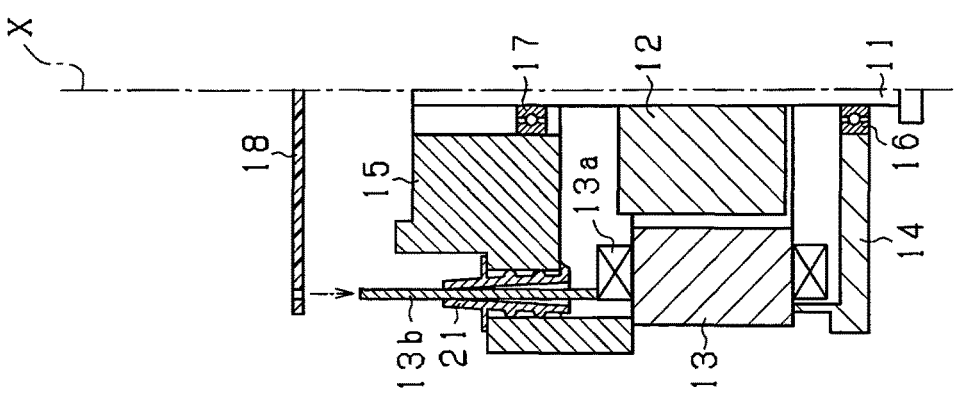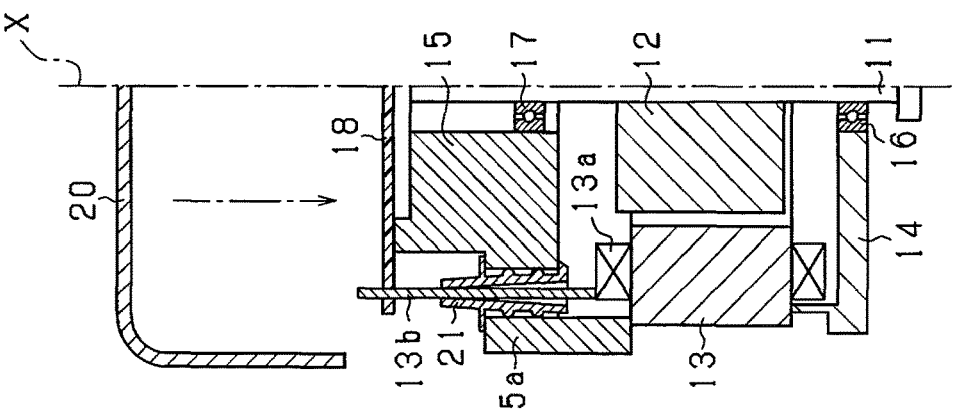

ELECTRIC MOTOR AND METHOD FOR MANUFACTURING THE SAME

CROSS REFERENCE TO RELATED APPLICATION

This application is based on Japanese Patent Application No. 2015-98194 filed on May 13, 2015, the disclosure of which is incorporated herein by reference.

FIELD OF TECHNOLOGY

The present disclosure relates to an electric motor having a rotor fixed to a rotating shaft, a stator core provided at an outer periphery of the rotor, stator coils wound on the stator core and coil terminals for electrically connecting the stator coils to a control circuit board. In addition, the present disclosure relates to a method of manufacturing the electric motor.

BACKGROUND

An electric motor is known in the art, for example, as disclosed in Japanese Patent Publication No. 2014-93880. The electric motor has a cylindrical motor casing, a stator core accommodated in the motor casing, a first plate member, a second plate member and a control circuit board. The first plate member, which is a part of the electric motor, is provided at a lower end of the electric motor for closing a lower side of the motor casing and rotatably supports a lower end of a rotating shaft. The second plate member, which is also a part of the electric motor, closes an upper side of the motor casing. Multiple coil terminals extending from stator coils wound on the stator core are inserted into respective through-holes formed in the second plate member, so that each of forward end of the coil terminals is electrically connected to the control circuit board provided at an upper side of the second plate member. In the electric motor, extraneous material may enter an inside of the electric motor formed between the first plate member and the second plate member and accommodating the stator core.

The electric motor of the above prior art has grommets for supporting the coil terminals, wherein each of the grommets is inserted into each of the through-holes formed in the second plate member so as to prevent the extraneous material from entering the inside of the electric motor. The grommet has a terminal holding hole, through which the coil terminal of the stator coil is inserted, and a flanged portion formed at a lower end thereof.

In a manufacturing process for assembling the grommet to the electric motor, the lower end of the grommet having the flanged portion is directed to the stator coil and the coil terminal of the stator coil is inserted into the terminal holding hole of the grommet, in a condition that the first plate member is fixed to the lower end of the motor casing and the stator coil is accommodated in the motor casing. Thereafter, the second plate member is fixed to an upper end of the motor casing. As a result, the grommet is fixed to the second plate member in a condition that the grommet is interposed between the stator coil and the second plate member and the flanged portion of the grommet is in contact with a lower side surface of the second plate member (that is, an axial end surface of the second plate member facing the stator coil).

As above, when the second plate member is fixed to the upper end of the motor casing, the grommet is surrounded by the second plate member and the motor casing. Therefore, it becomes difficult to check whether the grommet is correctly assembled to the second plate member during the manufacturing process of the electric motor, in particular, during a process for assembling the second plate member to the motor casing.

SUMMARY OF THE DISCLOSURE

The present disclosure is made in view of the above problem. It is an object of the present disclosure to provide an electric motor and a method for manufacturing the electric motor, according to which it is possible to easily and surely check, during an assembling process of the electric motor, whether a grommet is correctly fixed to a second plate member of the electric motor.

A means for solving the above problem and advantages of the present disclosure will be explained below.

According to one of features of the present disclosure, an electric motor is composed of;

a rotor fixed to a rotating shaft;

a first end frame for rotatably supporting a first shaft portion of the rotating shaft;

a second end frame for rotatably supporting a second shaft portion of the rotating shaft;

a stator core interposed between the first end frame and the second end frame in an axial direction of the electric motor and arranged at an outer periphery side of the rotor; and a stator winding wound on the stator core.

A terminal insertion hole, which is formed in the second end frame and extends in the axial direction of the electric motor, has a front-side open end formed at a front-side axial-end surface of the second end frame and opposing to the stator core and a rear-side open end formed at a rear-side axial-end surface of the second end frame opposite to the front-side axial-end surface.

A coil terminal extending in a direction to the second end frame from the stator winding is inserted through the terminal insertion hole.

A grommet is inserted into the terminal insertion hole so that the coil terminal is inserted through the grommet for holding the coil terminal by the second end frame.

The grommet has a main body portion, a terminal holding hole formed in the main body portion and a flanged portion formed at an outer periphery of the main body portion. The coil terminal is inserted through the terminal holding hole and the flanged portion is in contact with the rear-side axial-end surface surrounding the rear-side open end of the terminal insertion hole and thereby the grommet is attached to the second end frame.

According to the above feature of the present disclosure, the first shaft portion of the rotating shaft is rotatably supported by the first end frame, while the second shaft portion of the rotating shaft is rotatably supported by the second end frame. The stator core, which is interposed between the first end frame and the second end frame, is arranged at the outer periphery side of the rotor. The terminal insertion hole, which extends in the axial direction of the rotating shaft, is formed in the second end frame. The coil terminal, which extends from the stator winding wound on the stator core, is inserted through the terminal insertion hole.

In the above structure, extraneous material may enter an inside space of the electric motor, for example, an inside space formed between the stator core and the second end frame, through the terminal insertion hole formed in the second end frame. According to the present disclosure, therefore, the grommet for preventing the extraneous material from entering the inside space of the electric motor is assembled to the second end frame, in a condition that the coil terminal is inserted through the terminal insertion hole. More exactly, the grommet has the main body portion having the terminal holding hole, through which the coil terminal is inserted. The grommet has the flanged portion formed at the outer periphery of the main body portion. The grommet is inserted into the terminal insertion hole of the second end frame and the flanged portion of the grommet is brought into contact with the second end frame at the rear-side axial-end surface adjacent to the rear-side open end, which is formed at the opposite side to the stator core. As above, the grommet is attached to the second end frame in the direction from the rear-side open end to the front-side open end of the terminal insertion hole.

According to the above feature, it is possible to easily check whether the grommet is correctly and surely attached to the second end frame, even in the case that the first end frame and the second end frame are assembled in such a manner that the stator core is interposed between the first end frame and the second end frame.

BRIEF DESCRIPTION OF THE DRAWINGS

The above and other objects, features and advantages of the present disclosure will become more apparent from the following detailed description made with reference to the accompanying drawings. In the drawings:

FIGS. 3A to 3D are schematic views showing a process for assembling the electric motor;

FIGS. 5A to 5D are schematic views showing a process for assembling the electric motor according to a second embodiment of the present disclosure.

DETAILED DESCRIPTION OF THE EMBODIMENTS

Figure 1:
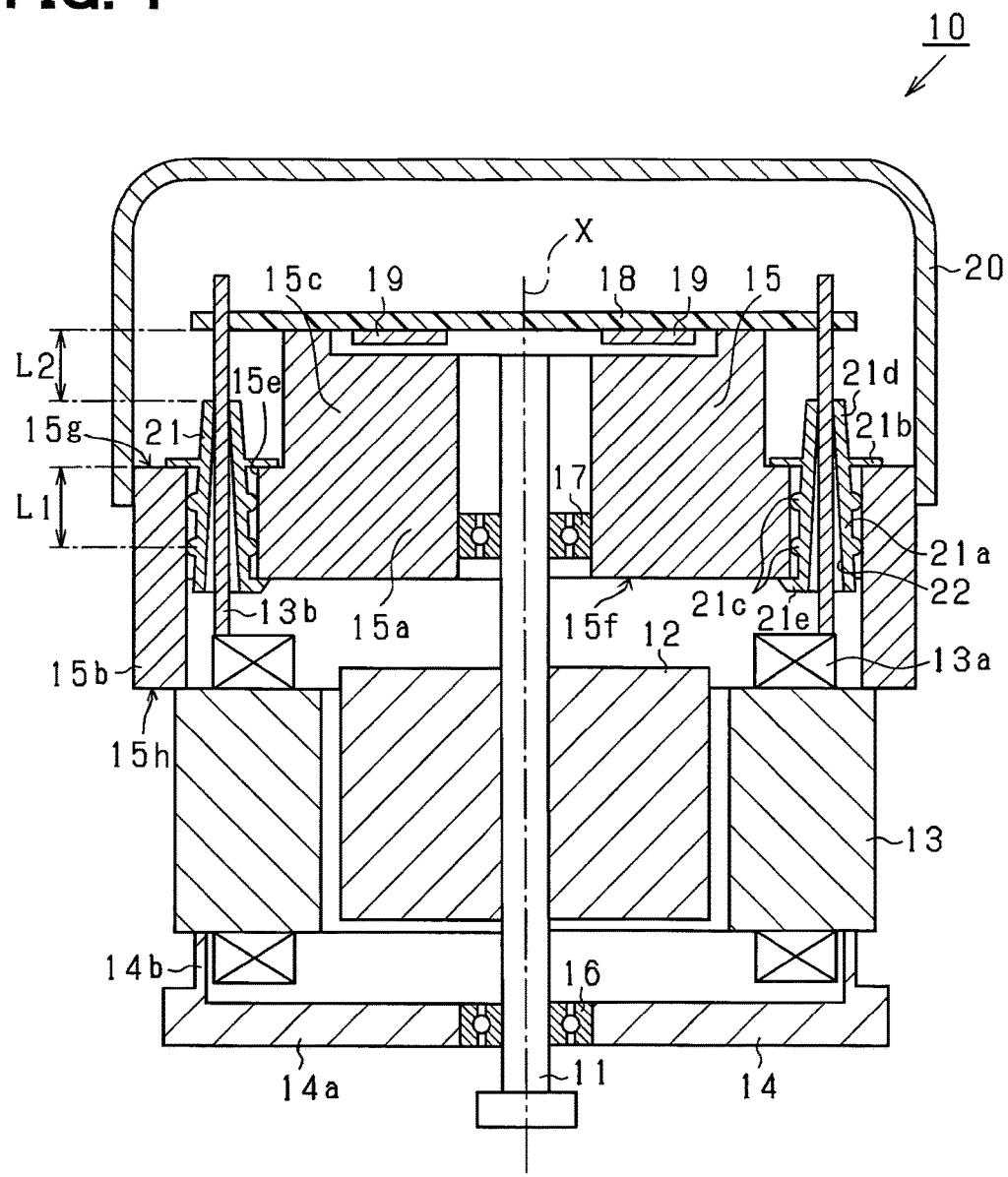
FIG. 1 is a schematic cross sectional view showing an electric motor according to a first embodiment of the present disclosure.

The present disclosure will be explained hereinafter by way of multiple embodiments and/or modifications with reference to the drawings. The same reference numerals are given to the same or similar structures and/or portions throughout the multiple embodiments and/or modifications in order to avoid repeated explanation.
(First Embodiment)

An electric motor 10 of the present disclosure is applied to, for example, an electric power steering device for a vehicle, which is usually located in a passenger compartment of the vehicle.

As shown in FIG. 1, the electric motor 10 is composed of a rotating shaft 11, a rotor 12, a stator core 13, a front end frame 14 (a lower-side plate member) and a rear end frame 15 (an upper-side plate member). The rotor 12 is fixed to the rotating shaft 11 so that the rotor 12 is rotated together with the rotating shaft 11. In the present embodiment, the rotor 12 has a permanent magnet (not shown).

The stator core 13 is formed in an annular shape. The rotor 12 is rotatably arranged inside of the stator core 13. In the present embodiment, the stator core 13 is made of multiple metal plates which are built up in an axial direction of the stator core 13. A stator winding 13a is wound on the stator core 13.

The front end frame 14 (a first end frame) is made of conductive material and has a front-end body portion 14a of an almost disc shape. In addition, the front end frame 14 has a front-end peripheral wall portion 14b, which is formed in a cylindrical shape and extends from an outer periphery of the front-end body portion 14a in a center axis direction X (hereinafter, the axial direction X) of the electric motor 10 (in a direction perpendicular to the front-end body portion 14a). An upper-side end of the front-end peripheral wall portion 14b is in contact with a lower-side outer periphery of the stator core 13. The front-end body portion 14a rotatably supports a front-side shaft portion of the rotating shaft 11 (a first shaft portion) via a front-side bearing 16 fixed to a center through-hole formed in the front-end body portion 14a.

Figure 4A:
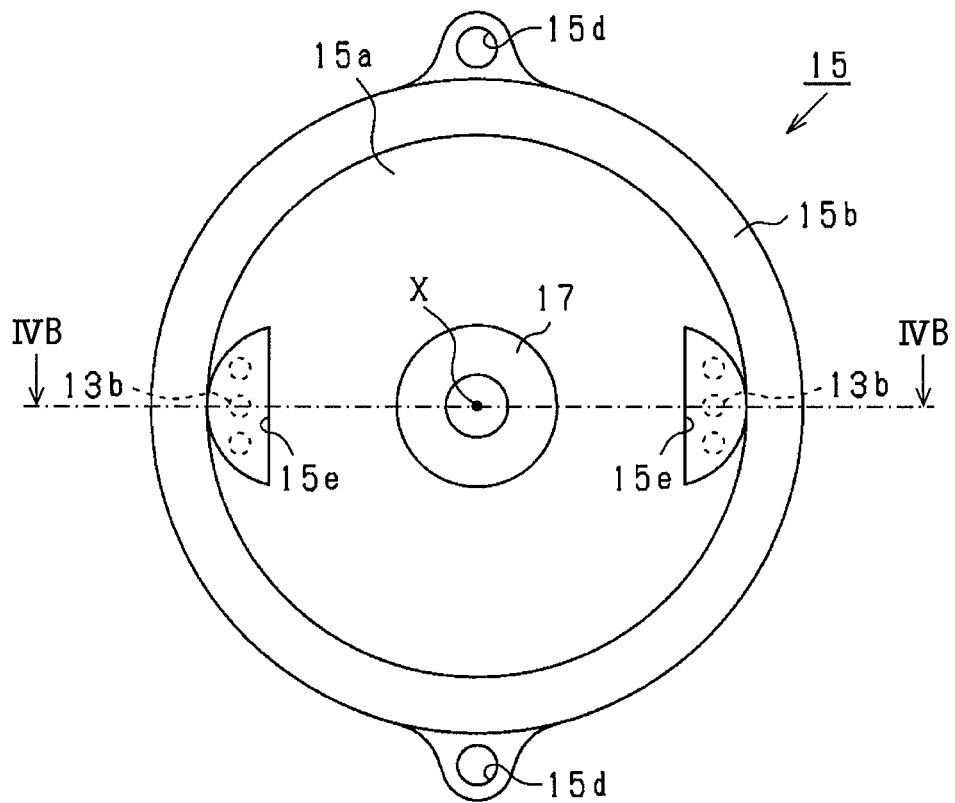
FIG. 4A is a schematic plane view showing the rear end frame, when viewed it from a front side.
Figure 4B:
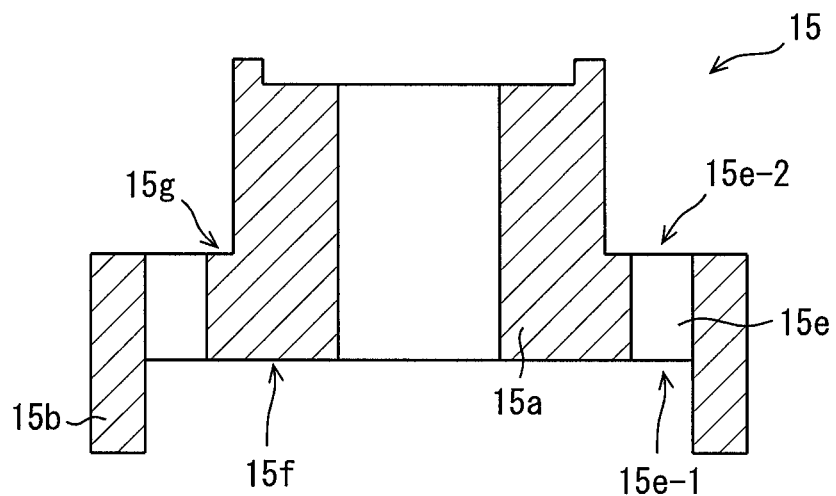
FIG. 4B is a schematic cross sectional view taken along a line IVB-IVB in FIG. 4A.

As shown in FIG. 1 and FIGS. 4A and 4B, the rear end frame 15 (a second end frame), which is likewise made of conductive material, is located at an axial side of the rotor 12 on its rear side opposite to the front end frame 14. The rear end frame 15 has a rear-end body portion 15a. The rear-end body portion 15a is formed in a disc shape and rotatably supports a rear-side shaft portion of the rotating shaft 11 (a second shaft portion) via a rear-side bearing 17 fixed to a center through-hole formed in the rear-end body portion 15a.

The rear end frame 15 has a rear-end peripheral wall portion 15b, which is formed in a cylindrical shape and extends from an outer periphery of the rear-end body portion 15a in the axial direction X of the electric motor 10 toward the stator core 13. A lower-side end 15h (a front-side end 15h) of the rear-end peripheral wall portion 15b is in contact with an upper-side outer periphery of the stator core 13. An inner peripheral surface of the rear-end peripheral wall portion 15b and the stator winding 13a are separated from each other in a radial direction of the electric motor 10 for the purpose of ensuring electric insulation between them. An outer diameter of the rear-end peripheral wall portion 15b is made to be larger than an outer diameter of the stator core 13, while an inner diameter of the rear-end peripheral wall portion 15b is made to be smaller than the outer diameter of the stator core 13. An inside space is formed by the rear-end peripheral wall portion 15b between the stator core 13 and the rear end frame 15.

The rear end frame 15 has a heat sink portion 15c in an area between the rotating shaft 11 and the rear-end peripheral wall portion 15b in the radial direction, wherein the heat sink portion 15c extends in the axial direction X from an upper-side surface 15g (a rear-side axial-end surface 15g) of the rear-end body portion 15a, that is, in an upward direction opposite to the stator core 13. The heat sink portion 15c corresponds a projecting portion formed on the upper-side surface 15g of the rear-end body portion 15a (on a side of the rear end frame 15 opposite to the stator core 13), wherein the heat sink portion 15c is projected in the upward direction along the axial direction X. A control circuit board 18 for controlling electric power supply to the stator winding 13a is provided on the heat sink portion 15c in such a manner that a lower-side surface (a front-side surface) of the control circuit board 18 is in contact with a board amounting portion of the heat sink portion 15c. An outer periphery of the control circuit board 18 outwardly extends in the radial direction of the electric motor 10 from an outer peripheral surface of the heat sink portion 15c.

In the present embodiment, the rear-end body portion 15a, the rear-end peripheral wall portion 15b and the heat sink portion 15c are integrally formed by, for example, a metal casting process, as one unit.

The front end frame 14 and the rear end frame 15 are connected to each other by any well-known fixing means, for example, through-bolts (not shown) inserted into bolt through-holes respectively formed in the front end frame 14 and the rear end frame 15, wherein the stator core 13 is interposed between the front end frame 14 and the rear end frame 15 in the axial direction X. Accordingly, the stator core 13, the front end frame 14 and the rear end frame 15 are firmly fixed to one another as one unit.

FIG. 4A shows the rear end frame 15, when viewed it from a front side thereof (from a lower side in FIG. 1). A pair of the bolt through-holes 15d, which is formed at an outer periphery of the rear-end peripheral wall portion 15b, is shown in FIG. 4A.

A base plate for the control circuit board 18 is made of electrically insulating material. In the present embodiment, an inverter and other circuits are formed in the control circuit board 18 for controlling the electric power supply to the stator winding 13a, so that the electric motor 10 is operated as an alternating current motor. More exactly, electronic parts and/or components 19, such as, semi-conductor devices, are mounted to the lower-side surface of the control circuit board 18 (the front-side surface facing the rear end frame 15) in order to supply the electric power to the stator winding 13a. The electronic parts and/or components 19 include heat generating parts and/or components, such as, power devices (for example, MOSFET) which generate heat upon receiving the electric power.

As a result of providing the heat sink portion 15c, the rear end frame 15 has a function of a heat sink, which not only accumulates temporarily heat of the heat generating parts and/or components 19 mounted to the control circuit board 18 but also radiates such heat to an outside of the control circuit board 18.

A cover member 20, which is formed in a cylindrical shape having a closed end (a reversed cup shape), is attached to an outer periphery of the rear-end body portion 15a (an outer peripheral surface) so as to cover the control circuit board 18. In the present embodiment, an outer peripheral surface of the stator core 13 is not covered by the cover member 20. In other words, the outer peripheral surface of the stator core 13 is exposed to the outside of the electric motor 10. According to the above structure of the present embodiment, the front end frame 14, the rear end frame 15 and the cover member 20 form a motor casing as a whole, which prevents the extraneous material (for example, water) from entering an inside of the electric motor 10.

The stator winding 13a is composed of multiple stator coils as explained below. Each of the stator coils of the stator winding 13a is electrically connected to the control circuit board 18 via each of coil terminals 13b, which passes through respective terminal insertion holes 15e formed in the rear end frame 15. Each of the coil terminals 13b extends from the respective stator coils in the upward direction of the axial direction X. A number of the coil terminals 13b corresponds to a number of electrical phases for the electric motor 10. In the present embodiment, the electric motor 10 is composed of a three-phase alternating current motor and two three-phase stator windings are provided in the electric motor 10. Therefore, six stator coils are provided in the stator core 13 and there are six coil terminals 13b upwardly extending from each of the stator coils.

As best shown in FIGS. 4A and 4B, each of the terminal insertion holes 15e is a through-hole formed in the rear-end body portion 15a at such a position opposing to locations of the respective coil terminals 13b of the stator winding 13a. In addition, each of the terminal insertion holes 15e is formed at the position, which is located at a radial inside of the rear-end peripheral wall portion 15b in the radial direction to the rotating shaft 11. In the present embodiment, the terminal insertion holes 15e is so formed that a part of an inner peripheral surface of the terminal insertion hole 15e is continuously connected to a part of an inner peripheral surface of the rear-end peripheral wall portion 15b in the axial direction X of the electric motor 10.

In the above structure, the extraneous material can enter the inside space between the stator core 13 and the rear end frame 15 via the terminal insertion holes 15e. More exactly, the extraneous material can pass through the terminal insertion holes 15e from a first space, which is formed and surrounded by the cover member 20 and the rear end frame 15, to a second space, which is formed and surrounded by the stator core 13 and the rear end frame 15. In addition, the extraneous material can pass through the terminal insertion holes 15e from the second space to the first space. In view of this point, in the present embodiment, a pair of grommets 21 is provided in the rear end frame 15 by inserting each of the grommets 21 into each of the terminal insertion holes 15e.

The grommet 21 is made of electrically insulating material. In the present embodiment, the grommet 21 is made of resin (for example, synthetic resin) or rubber so that three terminal holding portions are integrally formed in one grommet 21. In the present embodiment, as shown in FIGS. 4A and 4B, two terminal insertion holes 15e are formed in the rear end frame 15, although there are six coil terminals 13b. This is because one grommet 21 has three terminal holding portions respectively corresponding to three coil terminals 13b (indicated by dotted lines in FIG. 4A).

Figure 2:
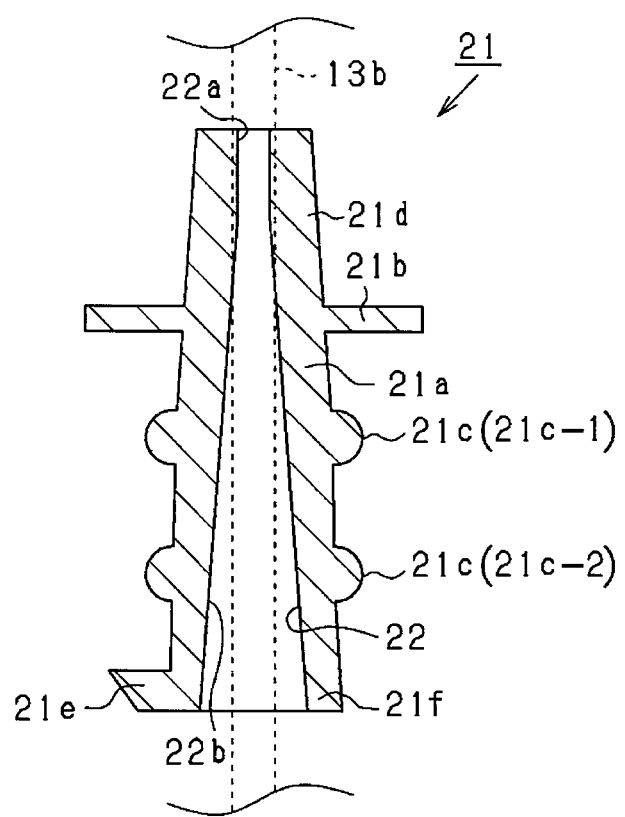
FIG. 2 is a schematically enlarged cross sectional view showing a grommet in a condition that it is not yet assembled to a rear end frame of the electric motor.

As shown in FIG. 2, each of the grommet 21 has a main body portion 21a and a flanged portion 21b. The three terminal holding portions are formed in the main body portion 21a, so that a terminal holding hole 22 is formed in each of the terminal holding portions. As indicated by dotted lines, each of the coil terminals 13b is inserted through the respective terminal holding hole 22. The flanged portion 21b is formed at an outer periphery of the main body portion 21a. In the present embodiment, the flanged portion 21b is formed at a middle portion of the main body portion 21a in its height direction (corresponding to the axial direction X), in which the terminal holding hole 22 extends. In addition, the flanged portion 21b is so formed as to surround an entire circumference of the main body portion 21a.

Two circular projected portions 21c (a first projected portion 21c-1 and a second projected portion 21c-2) are formed at the outer periphery of the main body portion 21a between the flanged portion 21b and a lower end 21f (a front-side end) of the grommet 21. As shown in FIG. 2, two circular projected portions 21c are formed at positions separated from each other in the height direction of the grommet 21. More exactly, the second projected portion 21c-2 is formed at a position more away from the flanged portion 21b than the first projected portion 21c-1. Each of the projected portions 21c (21c-1, 21c-2) is in contact with an inner peripheral surface of the terminal insertion hole 15e, when it is assembled to the rear end frame 15, as shown in FIG. 1. Each of the projected portions 21c (21c-1, 21c-2)

is also referred to as an inside contacting point. An upper-side portion 21d (a rear-side part) of the main body portion 21a, which extends from the flanged portion 21b in the upward direction of the height direction, is referred to as an outwardly extending portion 21d.

The grommet 21 is inserted into the terminal insertion hole 15e of the rear end frame 15 in a condition that each of the circular projected portions 21c (21c-1, 21c-2) is compressed and brought into contact with the inner peripheral surface of the terminal insertion hole 15e.

In the present embodiment, as shown in FIG. 4B, a lower-side open end 15e-1 (a front-side open end) of each terminal insertion hole 15e is opposed to the stator winding 13a, while an upper-side open end 15e-2 (a rear-side open end) of the terminal insertion hole 15e is opposed to the control circuit board 18 and opened at the upper-side surface 15g (the rear-side axial-end surface) of the rear-end body portion 15a of the rear end frame 15. The flanged portion 21b of the grommet 21 is brought into contact with the upper-side surface 15g of the rear-end body portion 15a surrounding the upper-side open end 15e-2 of the terminal insertion hole 15e.

The lower end 21f of the main body portion 21a is outwardly extending in the axial direction X from the lower-side open end 15e-1 of the terminal insertion hole 15e in a direction to the stator core 13. According to the above structure, the grommet 21 extends from the lower-side open end 15e-1 to the upper-side open end 15e-2, so that main body portion 21a of the grommet 21 exists in the radial direction between the rear end frame 15 (the inner peripheral surface of the terminal insertion hole 15e) and the coil terminal 13b continuously along the coil terminal 13b from the lower-side open end 15e-1 to the upper-side open end 15e-2.

A hook portion 21e is formed at the lower end 21f of the main body portion 21a, so as to extend from the lower end 21f in a radial-inward direction. Accordingly, the hook portion 21e is hooked at a peripheral surface portion of the lower-side open end 15e-1 (that is, a part of a front-side axial-end surface 15f of the rear-end body portion 15a). The hook portion 21e is so formed that the hook portion 21e does not interfere with the stator winding 13a in the axial direction X of the electric motor 10, in a condition that the flanged portion 21b is brought into contact with a peripheral surface portion of the upper-side open end 15e-2 (a part of the rear-side axial-end surface 15g), that is, in an assembled condition of the grommet 21 to the rear end frame 15.

In the present embodiment, the grommet 21 has such a structure that the grommet 21 does not easily drop out of the terminal insertion hole 15e, even when the hook portion 21e unfastens from the peripheral surface portion of the lower-side open end 15e-1 of the terminal insertion hole 15e due to a temperature change or a vibration of the electric motor 10 and thereby the grommet 21 is displaced in the upward direction to the control circuit board 18 along the coil terminal 13b.

More exactly, in the present embodiment, a first distance "L1" is made to be larger than a second distance "L2" (L1>L2). The first distance "L1" is a length of the grommet 21 in the axial direction X between the flanged portion 21b (more exactly, a lower-side surface of the flanged portion 21b which is in contact with the upper-side open end 15e-2 of the terminal insertion hole 15e) and the second projected projection 21c-2, which is in contact with the inner peripheral surface of the terminal insertion hole 15e at a position most away from the flanged portion 21b in the axial direction X. The second distance "L2" is a distance in the axial direction X from a forward end of the outwardly extending portion 21d to the lower-side surface of the control circuit board 18, that is, the front-side surface of the control circuit board 18 facing the rear end frame 15.

In other words, a height of the outwardly extending portion 21d of the grommet 21 is so designed that a distance from the flanged portion 21b to the forward end of the outwardly extending portion 21d satisfies a relation of "L2<L1".

The terminal holding hole 22 formed in the grommet 21 will be further explained with reference to FIG. 2. FIG. 2 is a cross sectional view showing the grommet 21 in a condition that it is not yet assembled to the rear end frame 15 and the coil terminal 13b is not yet inserted into the terminal holding hole 22. In FIG. 2, the coil terminal 13b is indicated by the dotted lines.

The upper-side portion (the rear-side part) of the outwardly extending portion 21d is formed as a small-diameter portion 22a, a cross sectional area of which is smaller than that of the coil terminal 13b. A radial space or gap between the coil terminal 13b and the grommet 21 (more exactly, an inner peripheral surface of the terminal holding hole 22) is made to be as smaller as possible (almost zero), so that the small-diameter portion 22a tightly holds the coil terminal 13b. A large-diameter portion 22b is so formed in a lower-side portion (a front-side part) of the main body portion 21a that an inner diameter of the terminal holding hole 22 is gradually increased in a direction from the small-diameter portion 22a to the lower end 21f of the grommet 21. In other words, the inner peripheral surface of the terminal holding hole 22 is formed with a tapered surface in an area of the lower-side portion of grommet 21, that is, the area from the flanged portion 21b to the lower end 21f. The coil terminal 13b is inserted into the terminal holding hole 22 from the lower end 21f of the grommet 21 in an assembling process. Therefore, the inner peripheral surface of the terminal holding hole 22 of the tapered surface works as a guide surface for guiding the coil terminal 13b from the lower end 21f to the small-diameter portion 22a.

A part of the assembling process for the electric motor 10 of the present embodiment will be explained with reference to FIGS. 3A to 3D.

As shown in FIG. 3A, a sub-assembly which is composed of the rotating shaft 11, the rotor 12, the stator core 13 and the front end frame 14 is prepared at first. The sub-assembly is set on an assembling machine (not shown) in a condition that the front end frame 14 is located at a lower side of the sub-assembly. The rear end frame 15 is moved down from a position above the sub-assembly in a downward direction, so that the coil terminals 13b are inserted into the terminal insertion hole 15e, although only one coil terminal 13b is shown in the drawing.

Thereafter, as shown in FIG. 3B, the grommet 21 is fitted to the coil terminals 13b in such a way that each of the three coil terminals 13b is inserted through the respective terminal holding hole 22 of the grommet 21, while the grommet 21 is inserted into the terminal insertion hole 15e. The grommet 21 is inserted into the terminal insertion hole 15e from the upper-side open end 15e-2 of the terminal insertion hole 15e. As above, the grommet 21 is assembled to the rear end frame 15.

Thereafter, as shown in FIG. 3C, the control circuit board 18 is electrically connected to the coil terminals 13b. For example, an upper end of each coil terminal 13b is inserted into a through-hole of a land formed in the control circuit board 18 and then soldered thereto.

Then, as shown in FIG. 3D, the cover member 20 is attached to the outer peripheral surface of the rear-end body portion 15a.

Advantages of the present embodiment will be explained.

In the above embodiment, the grommet 21 is inserted into the terminal insertion hole 15e from the upper-side open end 15e-2 of the rear end frame 15 after the rear end frame 15 has been assembled to the stator core 13, to thereby assemble the grommet 21 to the rear end frame 15. Therefore, it is possible to easily check, during the assembling process of the electric motor 10, whether the grommet 21 is correctly and surely assembled to the rear end frame 15.

In the present embodiment, the control circuit board 18 is located at the position opposing to the terminal insertion holes 15e of the rear end frame 15 and each of the coil terminals 13b extending from the stator winding 13a in the upward direction in parallel to the axial direction X is electrically connected to the control circuit board 18. In the above structure, the grommet 21 may be displaced in the direction to the control circuit board 18 along the coil terminal 13b. In particular, in the present embodiment, the heat sink portion 15c is formed in the rear end frame 15, so that the rear end frame 15 also works as the heat sink, and the control circuit board 18 is provided directly above the heat sink portion 15c. As a result, a size of the rear end frame 15 in the axial direction X becomes larger and thereby the distance between the control circuit board 18 and the upper-side open end 15e-2 of the terminal insertion hole 15e correspondingly becomes larger. According to such a structure, the grommet 21 may easily drop out of the terminal insertion hole 15e, when the grommet 21 is displaced in the direction to the control circuit board 18.

According to the present embodiment, however, the outwardly extending portion 21d is formed in the grommet 21. In addition, the distance in the axial direction X between the flanged portion 21b (which is in contact with the rear-end body portion 15a) and the forward end of the outwardly extending portion 21d is so designed that the second distance "L2" becomes smaller than the first distance "L1". According to such a structure of the present embodiment, it is possible to prevent the grommet 21 from dropping out of the terminal insertion hole 15e, even when the grommet 21 is displaced in the direction to the control circuit board 18 along the coil terminal 13b. In other words, it is possible to prevent the extraneous material from entering the inside of the electric motor 10, in particular, the second space formed between the rear end frame 15 and the stator core 13.

In the present embodiment, the forward end of the outwardly extending portion 21d is separated from the lower-side surface of the control circuit board 18, in the condition that the flanged portion 21b is in contact with the peripheral portion of the upper-side open end 15e-2 of the terminal insertion hole 15e. According to the above structure, it is possible to avoid a situation that a function of the small-diameter portion 22a for tightly holding the coil terminal 13b may be lost. In other words, the small-diameter portion 22a is formed so as to make the gap between the coil terminal 13b and the inner peripheral surface of the grommet 21 as small as possible (close to zero). The small-diameter portion 22a is formed only in the outwardly extending portion 21d in order to reduce a load for inserting the coil terminal 13b into the terminal holding hole 22.

A comparison example, which is different from the above first embodiment, will be explained. In the comparison example, the forward end of the outwardly extending portion 21d is brought into contact with the lower-side surface of the control circuit board 18, in the condition that the flanged portion 21b is in contact with the peripheral portion of the upper-side open end 15e-2 of the terminal insertion hole 15e. According to such a modified structure, it is possible to prevent the grommet 21 from being displaced in the direction to the control circuit board 18, even in the case of the temperature change and/or the vibration of the electric motor. However, in the comparison example, the forward end of the outwardly extending portion 21d directly receives thermal load from the control circuit board 18. The thermal load includes, for example, heat generated during a soldering process of the coil terminals 13b to the control circuit board 18. When the thermal load is applied to the forward end of the outwardly extending portion 21d, the shape of the small-diameter portion 22a may be easily changed. Then, the gap between the coil terminal 13b and the inner peripheral surface of the terminal holding hole 22 of the grommet 21 may become larger and thereby the function of the small-diameter portion 22a may be decreased and/or lost.

In view of the above point, according to the present embodiment, the forward end of the outwardly extending portion 21d is separated from the lower-side surface of the control circuit board 18 in order that the forward end of the outwardly extending portion 21d is not brought into contact with the lower-side surface of the control circuit board 18, in the condition that the flanged portion 21b is in contact with the peripheral portion of the upper-side open end 15e-2 of the terminal insertion hole 15e. Accordingly, it is possible to avoid the situation that the function of the small-diameter portion 22a is decreased and/or lost.

In the present embodiment, the lower end 21f of the main body portion 21a is outwardly extended in the downward direction from the lower-side open end 15e-1 of the terminal insertion hole 15e. According to the structure, it is possible to surely insulate the rear end frame 15 from the coil terminal 13b.

In the present embodiment, the second space is formed by the rear-end peripheral wall portion 15b between the rear end frame 15 and the stator core 13. It is desirable to form the terminal insertion hole 15e at the position, which is closer to the inner peripheral surface of the rear-end peripheral wall portion 15b in the radial direction as much as possible, for the purpose of making the size of the electric motor 10 smaller. In such a case, it is difficult to assure a space (a contact surface area) on the lower side 15f of the rear-end body portion 15a of the rear end frame 15, at which the flanged portion 21b is in contact with the peripheral portion of the lower-side open end 15e-1 of the terminal insertion hole 15e. However, in the present embodiment, it is possible to assure a sufficient space on the upper side of the rear-end body portion 15a, so that the flanged portion 21b is stably in contact with the peripheral portion of the upper-side open end 15e-2 of the terminal insertion hole 15e. Accordingly, it is more advantageous that the grommet 21 is inserted into the terminal insertion hole 15e from the upper-side open end 15e-2, in the case that the second space is formed and surrounded by the rear-end peripheral wall portion 15b between the rear end frame 15 and the stator core 13.

In the present embodiment, the hook portion 21e and the lower end 21f of the grommet 21 are configured so as not to be directly brought into contact with the stator winding 13a, in the condition that the flanged portion 21b is in contact with the peripheral portion of the upper-side open end 15e-2 of the terminal insertion hole 15e. Heat is generated when electric power is supplied to the stator winding 13a. When the hook portion 21e and/or the lower end 21f of the grommet 21 are in contact with the stator winding 13a, the shape of the hook portion 21e and/or the lower end 21f may be changed or deteriorated. Then, a holding force of the hook portion 21e for holding the grommet 21 in its hooked condition may be decreased. Therefore, it is possible in the present embodiment to avoid the situation that the shape of the hook portion 21e is changed, when the hook portion 21e and the lower end 21f of the grommet 21 is located at the position at which they are not in direct contact with the stator winding 13a.

(Second Embodiment)

A second embodiment of the present disclosure will be explained with reference to FIGS. 5A to 5D.

In the second embodiment, the assembling process of the first embodiment (FIGS. 3A to 3D) is modified in the following manner, as shown in FIGS. 5A to 5D.

As shown in FIG. 5A, the grommet 21 is inserted into the terminal insertion hole 15e from its upper-side open end 15e-2 so as to attach the grommet 21 to the rear end frame 15.

Then, a sub-assembly, which is composed of the rotating shaft 11, the rotor 12, the stator core 13 and the front end frame 14, is formed. The sub-assembly may be prepared in advance before the step of FIG. 5A.

As shown in FIG. 5B, the coil terminals 13b are inserted through the terminal holding hole 22 of the grommet 21, which is assembled to the rear end frame 15.

Thereafter, each of the coil terminals 13b is electrically connected to the control circuit board 18, as shown in FIG. 5C, and the cover member 20 is attached to the rear end frame 15, as shown in FIG. 5D. The steps of FIGS. 5C and 5D are identical to those of FIGS. 3C and 3D.

(Further Modifications)

The present disclosure is not limited to the above embodiments but can be further modified in various manners without departing from a spirit of the present disclosure.

For example, the outwardly extending portion 21d and/or the hook portion 21e may not be necessarily formed in the grommet 21.

The heat generating part(s) 19 may be provided not only on the control circuit board 18 but also on the heat sink portion 15c.

In the above embodiments, one grommet 21 is provided for the three coil terminals 13b. However, multiple grommets may be provided so that one grommet is used for each of the coil terminals 13b.

An entire portion of the grommet 21, which is inserted into the terminal insertion hole 15e, may be compressed. In other words, the projected portions 21c may not be necessarily formed at the outer periphery of the grommet 21.

The stator core 13, the front end frame 14 and the rear end frame 15 may be connected together as one unit by through-bolts or any other fixing means.

The electric motor may be applied not only to the electric power steering apparatus but also to any other devices or systems, such as, a power window device, a wiper system or the like.

What is claimed is:

1. An electric motor comprising:
   a rotor fixed to a rotating shaft;
   a first end frame for rotatably supporting a first shaft portion of the rotating shaft;
   a second end frame for rotatably supporting a second shaft portion of the rotating shaft, the second end frame comprising a rotor-facing axial-end surface and a rotor-opposing axial-end surface, wherein the rotor-facing axial-end surface faces toward the rotor and the rotor-opposing axial-end surface faces away from and opposes the rotor;
   a stator core interposed between the first end frame and the second end frame in an axial direction of the electric motor and arranged at an outer periphery side of the rotor;
   a stator winding wound on the stator core and being composed of multiple stator coils, each of which has multiple coil terminals;
   a pair of terminal insertion holes, each of which is formed in the second end frame and extending in the axial direction, and each of which has a rotor-facing open end formed at a rotor-facing axial-end surface of the second end frame and a rotor-opposing open end formed at a rotor-opposing axial-end surface of the second end frame;
   each of the coil terminals of each stator coil extending from the stator winding in a direction to the second end frame and inserted through the terminal insertion holes; and
   a pair of grommets, each of which is inserted into each of the terminal insertion holes so that the coil terminals of each stator coil is inserted through the grommets for holding the multiple coil terminals by the second end frame,
   wherein each of the grommets has a main body portion having a cross section of a non-circular shape, multiple terminal holding holes formed in the main body portion, a flanged portion formed at an outer periphery of the main body portion, and a hook portion,
   wherein each of the coil terminals is inserted through each of the terminal holding holes,
   wherein the flanged portion is in contact with the rotor-opposing axial-end surface of the second end frame surrounding the rotor-opposing open end of the terminal insertion holes and thereby the grommets are attached to the second end frame, and
   wherein the hook portion is formed at a rotor-facing end of the main body portion and extends in a radial-inward direction, so that the hook portion is hooked to the rotor-facing axial-end surface of the second end frame adjacent to the rotor-facing open end of the terminal insertion holes.

2. The electric motor according to claim 1, further comprising:
   a control circuit board provided on a side of the rotor-opposing axial-end surface of the second end frame and controlling electric power supply to the stator winding, so that the control circuit board has a rotor-facing surface that opposes the second end frame in the axial direction,
   wherein the control circuit board is located at a position that opposes the terminal insertion holes in the axial direction,
   wherein the coil terminals are connected to the control circuit board so as to electrically connect the control circuit board to the stator winding,
   wherein the flanged portion is formed at the outer periphery of the main body portion at its middle portion in the axial direction, a rotor-facing part of the main body portion extending from the flanged portion to each respective terminal insertion hole is inserted into the respective terminal insertion hole, and a rotor-opposing part of the main body portion extending from the flanged portion to the control circuit board is outwardly extending from each terminal insertion hole, wherein a first distance is made to be larger than a second distance, wherein the first distance corresponds to a length of the rotor-facing part of the main body portion between the flanged portion and an inside contacting point at which the rotor-facing part is in contact with an inner peripheral surface of the terminal insertion holes and which is located at a position most separated from the flanged portion among inside contacting points, and wherein the second distance corresponds to a distance in the axial direction between a forward end of the rotor-opposing part of the main body portion and the rotor-facing surface of the control circuit board.

3. The electric motor according to claim 2, further comprising:

a heat generating part mounted to the control circuit board, wherein the heat generating part generates heat when electric power is supplied to the heat generating part, wherein the second end frame has a heat sink portion between the rotor-opposing axial-end surface and the control circuit board in the axial direction, and the heat sink portion radiates the heat generated at the heat generating part to an outside of the second end frame.

4. The electric motor according to claim 2, wherein each of the terminal holding holes of the grommets has a small-diameter portion in the rotor-opposing part of the main body portion, a cross sectional area of the small-diameter portion is smaller than a cross sectional area of the coil terminals, in a condition that the grommets are not assembled to the second end frame, each of the terminal holding holes of the grommets has a large-diameter portion in the rotor-facing part of the main body portion, a cross sectional area of the large-diameter portion is larger than the cross sectional area of the small-diameter portion, in the condition that the grommets are not assembled to the second end frame, the forward end of the rotor-opposing part of the main body portion is separated from the rotor-facing surface of the control circuit board in the axial direction in the condition that the flanged portion is in contact with the rotor-opposing axial-end surface surrounding the rotor-opposing open end of the terminal insertion holes.

5. The electric motor according to claim 1, further comprising:

a control circuit board provided on a side of the rotor-opposing axial-end surface of the second end frame and controlling electric power supply to the stator winding; and a cover member connected to a part of an outer peripheral surface of the second end frame so as to cover the control circuit board, wherein the coil terminals electrically connect the control circuit board to the stator winding, wherein an outer peripheral surface of the stator core is not covered by the cover member so that the outer peripheral surface of the stator core is exposed to an outside of the electric motor, wherein the second end frame has a rear-end peripheral wall portion extending in the axial direction to the stator core and its rotor-facing end is in contact with an outer periphery of the stator core, wherein a space is formed and surrounded by the rear-end peripheral wall portion between the stator core and the second end frame, and wherein the terminal insertion holes are formed in the second end frame at a position, which is inside of the rear-end peripheral wall portion in a radial direction of the electric motor toward the rotating shaft.

6. The electric motor according to claim 1, wherein a rotor-facing end of the main body portion of the grommets, which is located on a side to the stator core, is so arranged at a position that the rotor-facing end of the main body portion is not in contact with the stator winding, in the condition that the flanged portion is in contact with the rotor-opposing axial-end surface of a rear end frame.

7. A method for manufacturing the electric motor according to claim 1 comprising:

a step for inserting the coil terminals through the terminal insertion holes formed in the second end frame; and a step for inserting the coil terminals through the terminal holding holes of the grommets and inserting the grommets into the terminal insertion holes from the rotor-opposing open end, in a condition that the coil terminals are inserted through the terminal insertion holes, to thereby assemble the grommets to the second end frame.

8. A method for manufacturing the electric motor according to claim 1 comprising:

a step for inserting the grommets into the terminal insertion holes of the second end frame from the rotor-opposing open end, to thereby attach the grommets to the second end frame; and a step for inserting the coil terminals through the terminal holding holes of the grommets, in a condition that the grommets are attached to the second end frame.

* * * * *